(12) United States Patent
Onishi

(10) Patent No.: US 8,928,898 B2
(45) Date of Patent: Jan. 6, 2015

(54) IMAGE FORMING APPARATUS INCLUDES A TRANSPORT GUIDE MEMBER AND A DETECTION MECHANISM

(71) Applicant: KYOCERA Document Solutions Inc., Osaka (JP)

(72) Inventor: Yuzo Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/283,146

(22) Filed: May 20, 2014

(65) Prior Publication Data

US 2014/0347684 A1  Nov. 27, 2014

(30) Foreign Application Priority Data

May 27, 2013  (JP) ................. 2013-110694

(51) Int. Cl.
*G06K 15/00* (2006.01)
*H04N 1/405* (2006.01)
*B41C 1/00* (2006.01)
*H04N 1/04* (2006.01)
*H04N 1/00* (2006.01)

(52) U.S. Cl.
CPC ................. *H04N 1/00655* (2013.01)
USPC ......... 358/1.12; 358/3.15; 358/3.32; 358/498

(58) Field of Classification Search
USPC ............. 358/1.12, 3.32, 3.15, 449, 498, 296; 271/3.14, 3.12, 3.13, 113, 180; 399/101, 121, 122, 123, 124, 126, 144, 399/154, 162, 167, 176, 281, 303, 313, 331, 399/370, 377, 381, 386, 389, 393, 397
See application file for complete search history.

(56) References Cited

U.S. PATENT DOCUMENTS

| | | | | |
|---|---|---|---|---|
| 5,083,761 A | * | 1/1992 | Johdai et al. | 271/3.02 |
| 2005/0189699 A1 | * | 9/2005 | Yamamoto | 271/113 |
| 2012/0248682 A1 | | 10/2012 | Arikawa et al. | 271/225 |

FOREIGN PATENT DOCUMENTS

| | | |
|---|---|---|
| JP | 2007-297141 A | 11/2007 |
| JP | 2011-11828 A | 1/2011 |

OTHER PUBLICATIONS

Soda Koji et al., Image Forming Device, Jan. 20 2011, Machine Translation of Japanese Patent Application Publication, JP 2011011828, all pages.*

* cited by examiner

*Primary Examiner* — Ngon Nguyen
(74) *Attorney, Agent, or Firm* — Stein IP, LLC

(57) ABSTRACT

An image forming apparatus includes a transport guide member, and a detection mechanism. The transport guide member guides a recording medium. The detection mechanism detects presence or absence of the recording medium. An actuator portion of the detection mechanism includes a shaft portion and a detection portion configured to swing about the shaft portion when abutting the recording medium. A first guide rib of the transport guide member is provided with a notch portion through which the shaft portion penetrates. The shaft portion is provided with a second guide rib configured to close an opening of the notch portion viewed from an axis direction of the shaft portion.

10 Claims, 9 Drawing Sheets

IMAGE FORMING APPARATUS INCLUDES A TRANSPORT GUIDE MEMBER AND A DETECTION MECHANISM

CROSS-REFERENCE TO RELATED APPLICATIONS

This application is based upon and claims the benefit of priority from the corresponding Japanese Patent Application No. 2013-110694, filed May 27, 2013, the entire contents of which are hereby incorporated by reference.

BACKGROUND OF THE INVENTION

The present disclosure relates to an image forming apparatus such as a copier, a printer, a facsimile machine, a multifunction peripheral thereof, and the like utilizing an electrophotographic method. In particular, the present disclosure relates to an image forming apparatus including a transport guide member for guiding a recording medium and a detection mechanism for detecting presence or absence of the recording medium.

Conventionally, in an image forming apparatus using the electrophotographic process, it is common to use a process in which a developing device visualizes an electrostatic latent image formed on an image carrier such as a photoreceptor drum, the visualized image (toner image) is transferred onto a paper sheet (recording medium), and then a fixing process is performed.

The paper sheet is transported by rollers along a transport guide member and the like. The transport guide member is constituted, for example, of a plurality of plate-like guide ribs or the like disposed at a predetermined interval in a width direction of the paper sheet (perpendicular to a sheet transport direction).

In addition, a detection mechanism for detecting presence or absence of the recording medium is disposed in the sheet transport path. The detection mechanism includes, for example, an actuator portion extending in the width direction of the paper sheet so as to swing when abutting the paper sheet, and a sensor portion for detecting the swing of the actuator portion. The actuator portion includes a shaft portion extending in the width direction of the paper sheet, a detection portion swinging integrally with the shaft portion when abutting the paper sheet, and a swing portion disposed to shaft portion so as to swing about the shaft portion.

It is necessary to dispose the actuator portion at a position to abut the paper sheet and not to prevent the paper sheet from being transported. Therefore, a notch portion through which the shaft portion of the actuator portion penetrates is formed in the guide rib, and a most part of the actuator portion is disposed inside the transport guide member.

SUMMARY OF THE INVENTION

An image forming apparatus according to one aspect of the present disclosure includes a transport path in which a recording medium passes, a transport member, a transport guide member, and a detection mechanism. The transport member is disposed in the transport path so as to transport the recording medium. The transport guide member constitutes the transport path so as to guide the recording medium. The detection mechanism is disposed in the transport path so as to detect presence or absence of the recording medium. In addition, the detection mechanism includes an actuator portion swinging when abutting the recording medium, and a sensor portion configured to detect the swing of the actuator portion. The actuator portion includes a shaft portion extending in a width direction of the recording medium, which is orthogonal to a transport direction of the recording medium, a detection portion disposed to protrude from the shaft portion outward in a radial direction so as to swing about the shaft portion in a transport direction when abutting the recording medium. The transport guide member includes a base portion, and a plurality of first guide ribs disposed to stand on the base portion at a predetermined interval in the width direction of the recording medium so as to guide the recording medium. A notch portion through which the shaft portion of the actuator portion penetrates is formed in the first guide rib. A second guide rib protruding outward in the radial direction from the shaft portion is disposed at a position corresponding to at least one of the first guide ribs in which the notch portion is formed on the shaft portion. The second guide rib is disposed so as to close an opening of the corresponding notch portion viewed from an axis direction of the shaft portion.

Further objects and specific advantages of the present disclosure will become more apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Now, an embodiment of the present disclosure is described with reference to the drawings.

An image forming apparatus 100 according to an embodiment of the present disclosure is described with reference to FIGS. 1 to 8.

In this embodiment, the image forming apparatus 100 (a color printer in this example) is a quadruple tandem color printer for forming an image in which four photoreceptor drums 1a, 1b, 1c and 1d corresponding to four different colors (yellow, cyan, magenta and black) are disposed in parallel.

Figure 1:
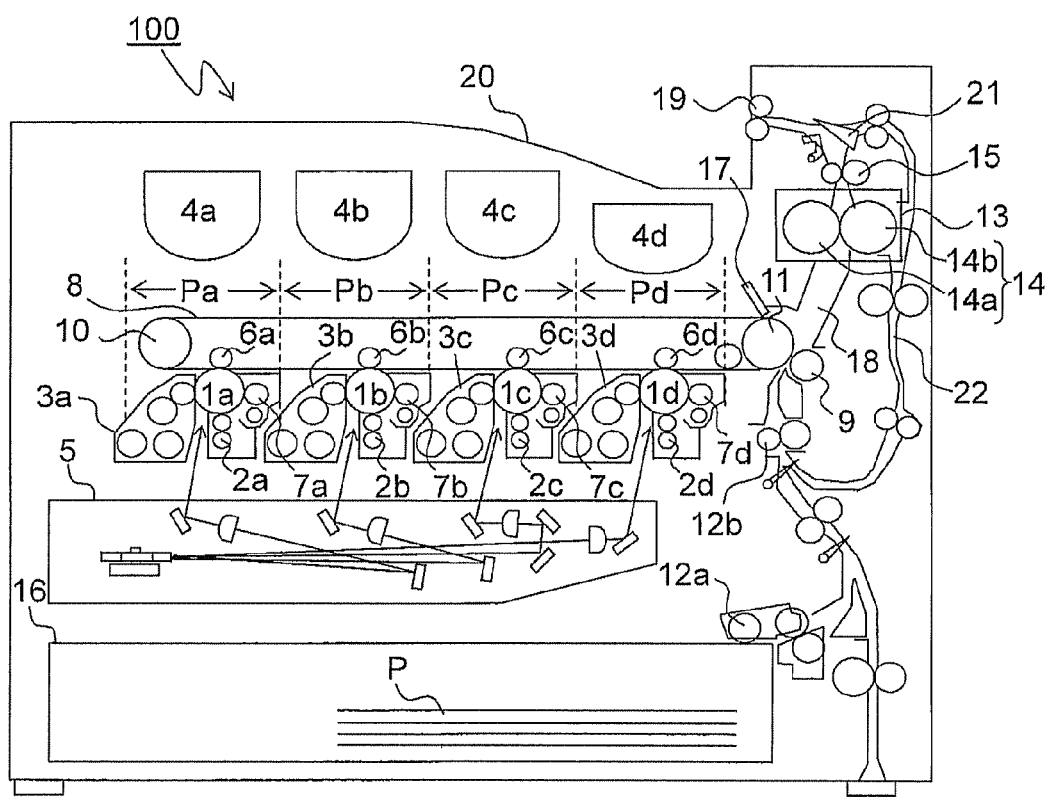
FIG. 1 is a cross-sectional view schematically illustrating a structure of an image forming apparatus according to one embodiment of the present disclosure.

In an apparatus main body of the image forming apparatus 100, there are four image forming portions Pa, Pb, Pc and Pd disposed in this order from the left side in FIG. 1. These image forming portions Pa to Pd are disposed to correspond to four different color images (yellow, cyan, magenta and black images), which respectively form yellow, cyan, magenta and black images sequentially by steps of electrification, exposure, developing and transferring.

The photoreceptor drums (image carriers) 1a to 1d for carrying visualized images (toner images) of the individual colors are respectively disposed in the image forming portions Pa to Pd. Further, an intermediate transfer belt 8 turning in a counterclockwise direction in FIG. 1 is disposed adjacent to the image forming portions Pa to Pd. The toner images formed on the photoreceptor drums 1a to 1d are sequentially transferred onto the intermediate transfer belt 8 moving while contacting with the photoreceptor drums 1a to 1d, and then are transferred onto a paper sheet P by a secondary transferring roller 9. Further, the toner images are fixed onto the paper sheet P as the recording medium by a fixing device 13, and then the paper sheet P is discharged from the apparatus main body. The photoreceptor drums 1a to 1d are rotated in a clockwise direction in FIG. 1, and image forming processes are achieved on the photoreceptor drums 1a to 1d.

The paper sheet P onto which the toner image is to be transferred is stored in a paper sheet cassette 16 in a lower part of the apparatus, and the paper sheet P is transported to the secondary transferring roller 9 by a sheet feed roller 12a and a registration roller pair 12b. A sheet made of dielectric resin is used for the intermediate transfer belt 8, and a seamless belt is mainly used for the same. The intermediate transfer belt 8 and the secondary transferring roller 9 are driven to rotate by a belt drive motor (not shown) at the same linear velocity as the photoreceptor drums 1a to 1d. In addition, a blade-like belt cleaner 17 for removing toner and the like remaining on a surface of the intermediate transfer belt 8 is disposed on a downstream side of the secondary transferring roller 9.

Next, the image forming portions Pa to Pd are described. Around and below the photoreceptor drums 1a to 1d disposed in a rotatable manner, there are disposed charging devices 2a, 2b, 2c and 2d for charging the photoreceptor drums 1a to 1d, an exposure unit 5 for performing exposure on the photoreceptor drums 1a to 1d based on image data, developing units 3a, 3b, 3c and 3d for developing electrostatic latent images formed on the photoreceptor drums 1a to 1d with toner, and cleaning devices 7a, 7b, 7c and 7d for removing and collecting developer (toner) remaining on the photoreceptor drums 1a to 1d after transferring the toner images.

When image data is input from a host apparatus such as a personal computer, the charging devices 2a to 2d uniformly charge surfaces of the photoreceptor drums 1a to 1d first, and next the exposure unit 5 performs light irradiation based on the image data so as to form electrostatic latent images corresponding to the image data on the photoreceptor drums 1a to 1d. The developing units 3a to 3d include developing rollers disposed to be opposed to the photoreceptor drums 1a to 1d, and a predetermined amount of two-component developer containing each color toner of cyan, magenta, yellow and black is filled in each of the developing units 3a to 3d.

Note that when a ratio of toner in the two-component developer filled in the developing units 3a to 3d becomes lower than a predetermined value by toner image formation described later, toner is supplied from toner containers 4a to 4d to the developing units 3a to 3d. The toner is supplied onto the photoreceptor drums 1a to 1d by the developing units 3a to 3d so as to be adhered in an electrostatic manner, and hence the toner image is formed corresponding to the electrostatic latent image formed by exposure by the exposure unit 5.

Further, each of primary transferring rollers 6a to 6d applies an electric field by a predetermined transferring voltage between each of the primary transferring rollers 6a to 6d and each of the photoreceptor drums 1a to 1d. Then, the yellow, cyan, magenta and black toner images on the photoreceptor drums 1a to 1d are primarily transferred onto the intermediate transfer belt 8. These four color images are formed with a predetermined positional relationship for forming a predetermined full color image. After that, in order to prepare for new formation of electrostatic latent images performed next, toners remaining on the surface of the photoreceptor drums 1a to 1d are removed by the cleaning devices 7a to 7d.

The intermediate transfer belt 8 is stretched around a following roller 10 and a drive roller 11. When the drive roller 11 is rotated by the belt drive motor, the intermediate transfer belt 8 turns in a counterclockwise direction. Then, the paper sheet P is transported at a predetermined timing from the registration roller pair 12b to a nip portion (secondary transferring nip portion) between the intermediate transfer belt 8 and the secondary transferring roller 9 disposed adjacent to the intermediate transfer belt 8. Thus, the full color image is secondarily transferred onto the paper sheet P in the nip portion. The paper sheet P with the transferred toner image is transported to the fixing device 13.

When the paper sheet P transported to the fixing device 13 passes through a fixing nip portion between a fixing roller pair 14 including a heating roller 14a and a pressing roller 14b, the paper sheet P is heated and pressed so that the toner image is fixed onto the surface of the paper sheet P, and hence a predetermined full color image is formed. The paper sheet P on which the full color image is formed passes through a transport roller pair 15, and its transport direction is divided by a branching member 21 disposed at a branch of a sheet transport path 18. Thus, the paper sheet P is discharged as it is (or after being sent to a double-sided transport path 22 so that both sides are copied) onto a discharge tray 20 via a discharge roller pair 19.

Specifically, the sheet transport path 18 branches into left and right on the downstream side of the transport roller pair 15. One path (branching to left in FIG. 1) communicates to the discharge tray 20. Further, the other path (branching to right in FIG. 1) communicates to the double-sided transport path 22. When images are formed on both sides of the paper sheet P, a part of the paper sheet P after passing through the fixing device 13 is temporarily protruded to the outside of the apparatus from the discharge roller pair 19.

After that, the discharge roller pair 19 is reversely rotated, and the branching member 21 is moved to swing to be substantially horizontal. Then, the paper sheet P is guided to the double-sided transport path 22 along the upper face of the branching member 21, and is transported again to the secondary transferring roller 9 in a state where the imaging surface is turned over. Then, a next image formed on the intermediate transfer belt 8 is transferred by the secondary transferring roller 9 onto the surface of the paper sheet P on which the image is not yet formed, and the paper sheet P is transported to the fixing device 13 so that the toner image is fixed. After that, the paper sheet P is discharged onto the discharge tray 20.

Figure 2:
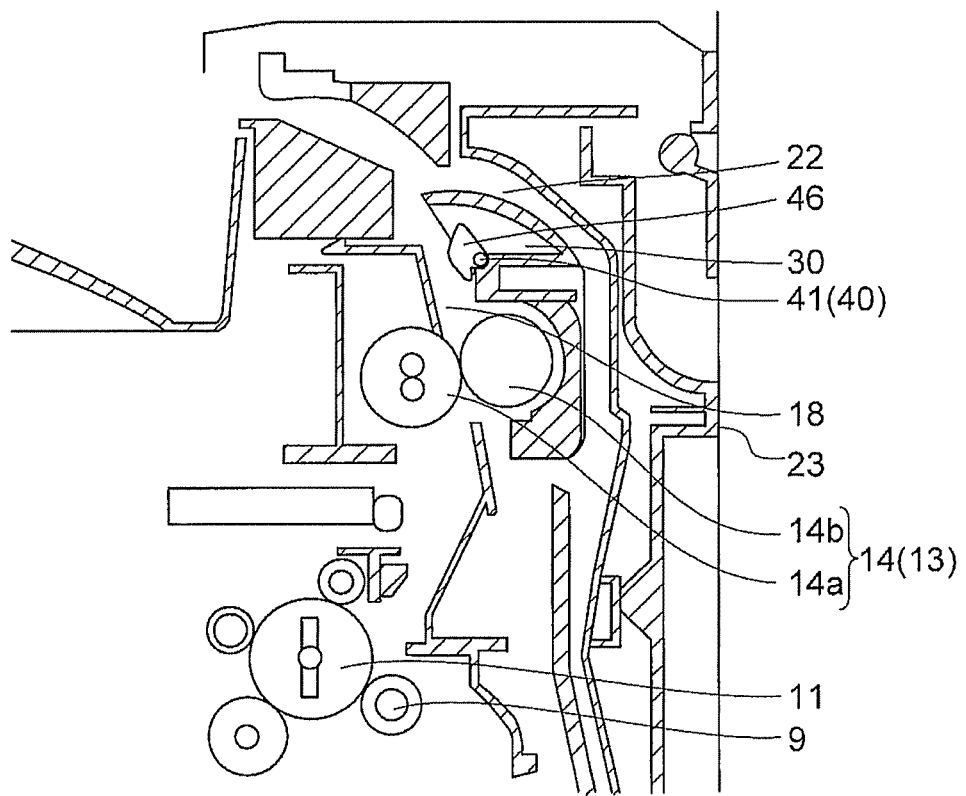
FIG. 2 is a cross-sectional view illustrating a transport guide member peripheral structure of the image forming apparatus according to the one embodiment of the present disclosure.

As illustrated in FIG. 2, above the fixing device 13 (on the downstream side in the sheet transport direction), there is disposed a transport guide member 30 made of resin for guiding the paper sheet P. The transport guide member 30 constitutes a part of the sheet transport path 18 and a part of the double-sided transport path 22. When a cover member 23 is opened, the double-sided transport path 22 is exposed. Further, when the transport guide member 30 is moved to swing upward about a pivot disposed above, the sheet transport path 18 is exposed.

Figure 3:
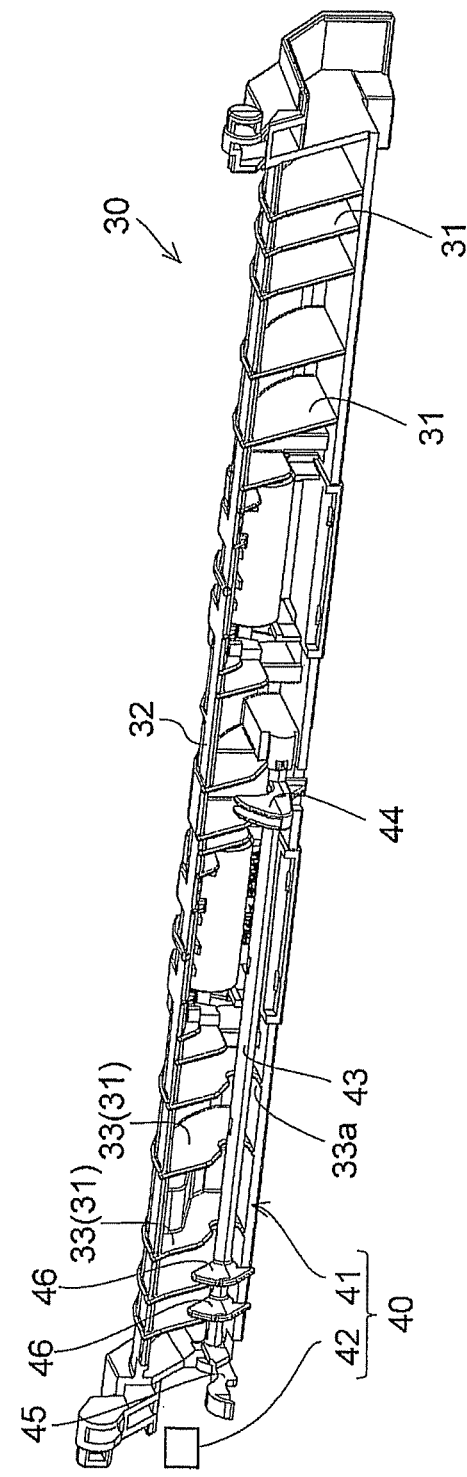
FIG. 3 is a perspective view illustrating a structure of a transport guide member and a detection mechanism of the image forming apparatus according to the one embodiment of the present disclosure.
Figure 4:
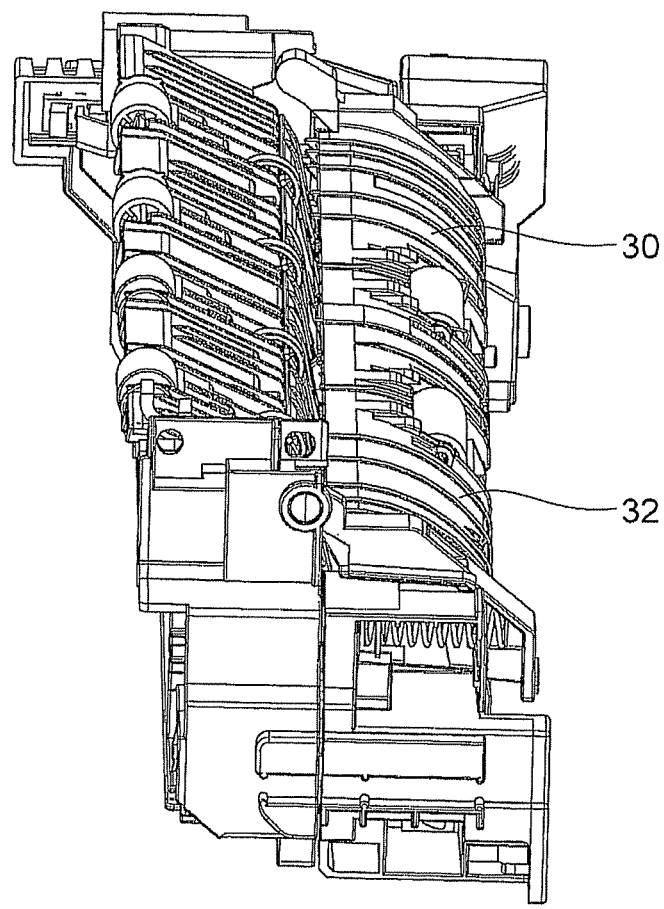
FIG. 4 is a perspective view illustrating the transport guide member peripheral structure of the image forming apparatus according to the one embodiment of the present disclosure.

As illustrated in FIG. 3, the transport guide member 30 is constituted of a plurality of plate-like guide rib 31 disposed at a predetermined interval in the width direction of the paper sheet P (which is perpendicular to the sheet transport direction and is perpendicular to the paper plane of FIG. 2) so as to guide the paper sheet P, a guide curved surface portion 32 that extends in the width direction of the paper sheet P and is formed integrally with the plurality of guide ribs 31 (see also FIG. 4), and the like. The guide ribs 31 constitute a part of the sheet transport path 18, and the guide curved surface portion 32 constitute a part of the double-sided transport path 22. In other words, the transport guide member 30 includes a base portion (guide curved surface portion 32) and the guide ribs 31 standing on the base portion. One surface on which the guide ribs 31 are disposed guides the paper sheet P on which the image is formed in the image forming portions Pa to Pd to the discharge roller pair 19 (discharge portion), and other surface formed on the backside of the base portion guides the paper sheet P transported reversely from the discharge roller pair 19 to the double-sided transport path 22.

In addition, as illustrated in FIG. 2, the sheet transport path 18 is provided with a detection mechanism 40 for detecting presence or absence of the paper sheet P, which is disposed in a vicinity of the upper side of the fixing roller pair 14 (on the downstream side in the sheet transport direction). As illustrated in FIG. 3, the detection mechanism 40 is disposed only on one side (the left side in FIG. 3) from the middle of a paper sheet passing region. The detection mechanism 40 includes an actuator portion 41 extending in the width direction of the paper sheet P so as to swing when abutting the paper sheet P, a sensor portion 42 constituted of a PI sensor or the like configured to detect swinging of the actuator portion 41. There is disposed a link member (not shown) or the like that is driven to move (swing, for example) by swinging of a swing portion 45 described later of the actuator portion 41, and the sensor portion 42 is configured to detect swinging of the actuator portion 41 by detecting the movement of the link member. Note that the sensor portion 42 may be configured to detect directly the swinging of the swing portion 45 described later of the actuator portion 41.

It is necessary to dispose the actuator portion 41 in a position to abut the paper sheet P and not to prevent transportation of the paper sheet P. Therefore, a notch portion 33a through which a shaft portion 43 described later of the actuator portion 41 penetrates is formed in a first guide ribs 33 disposed on the left side (on the one side from the middle of the paper sheet passing region) among the plurality of guide ribs 31. This notch portion 33a is formed in a front part of the first guide ribs 33 (a part constituting the sheet transport path 18). Further, a most part of the actuator portion 41 is disposed inside the transport guide member 30.

The actuator portion 41 includes the shaft portion 43 that extends in the width direction of the paper sheet P and is pivoted by the transport guide member 30 in a swingable manner, a detection portion 44 disposed to protrude outward in the radial direction from the shaft portion 43 so as to swing about the shaft portion 43 in the transport direction when abutting the paper sheet P, and the swing portion 45 disposed on the shaft portion 43 so as to swing about the shaft portion 43 in the transport direction.

The shaft portion 43 extends to one side (the left side in FIG. 3) from the middle of the paper sheet passing region (the middle of the transport guide member 30) and is formed to the outside of the paper sheet passing region. The detection portion 44 is fixed to the other end of the shaft portion 43 (the right end in FIG. 3), is disposed in the middle of the paper sheet passing region, and is formed to protrude into the sheet transport path 18. The swing portion 45 is disposed outside the paper sheet passing region and is also fixed to one end of the shaft portion 43 (the left end in FIG. 3).

Figure 5:
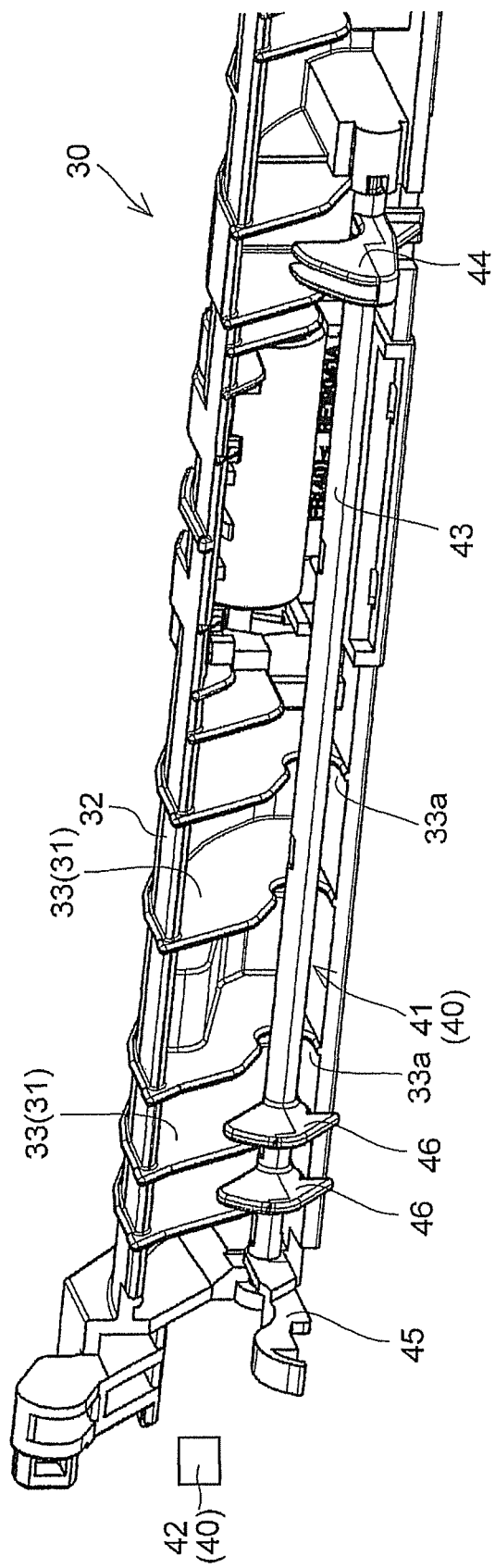
FIG. 5 is a perspective view illustrating a structure of the transport guide member and the detection mechanism of the image forming apparatus according to the one embodiment of the present disclosure.
Figure 6:
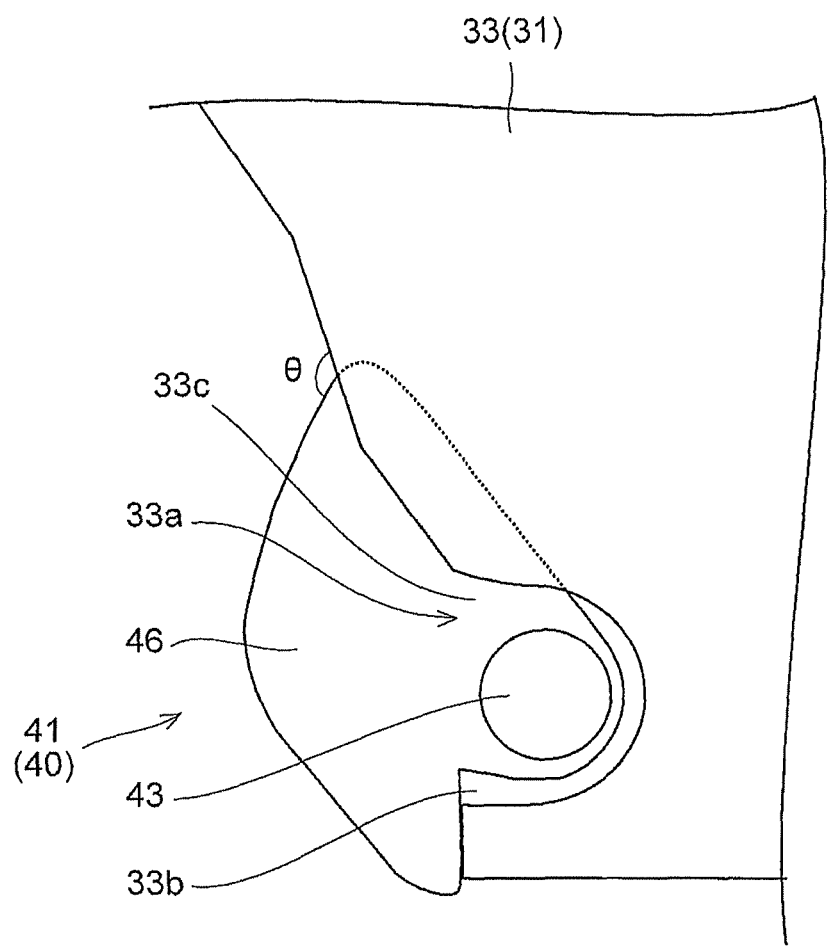
FIG. 6 is an enlarged cross-sectional view illustrating a structure of a first guide rib and a second guide rib of the image forming apparatus according to the one embodiment of the present disclosure.

In addition, as illustrated in FIG. 5 and FIG. 6, the shaft portion 43 is provided with a second guide rib 46 that closes an opening (overlaps an opening) of the notch portion 33a viewed from an axis direction of the shaft portion 43. The second guide rib 46 is disposed to protrude outward in the radial direction from the shaft portion 43 so as to correspond to at least one of the first guide ribs 33 in which the notch portion 33a is formed, and hence closes the opening of the corresponding notch portion 33a. The second guide rib 46 is disposed in a position of the shaft portion 43 closer to an outside of the paper sheet passing region. Specifically, the second guide rib 46 is disposed in a position inside and end of the paper sheet passing region. In other words, the second guide rib 46 is disposed in a position where the curled front edge of the paper sheet P (the end in the width direction) can be easily caught. In addition, the second guide rib 46 is fixed to the shaft portion 43 and swings integrally with the shaft portion 43.

Figure 7:
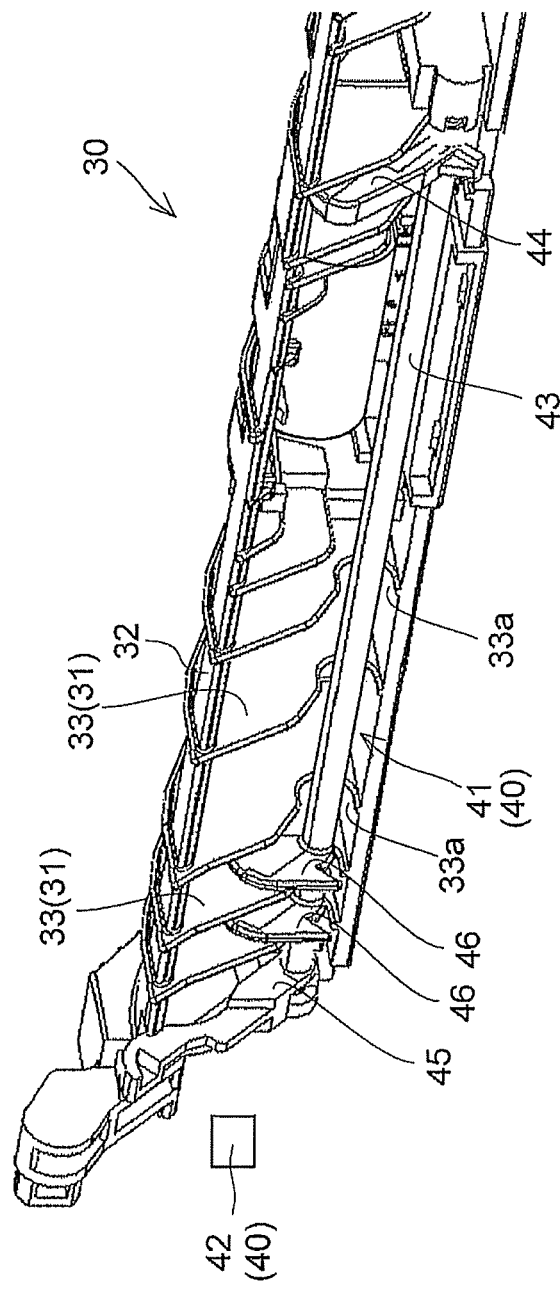
FIG. 7 is a perspective view illustrating a structure of the transport guide member and the detection mechanism of the image forming apparatus according to the one embodiment of the present disclosure.
Figure 8:
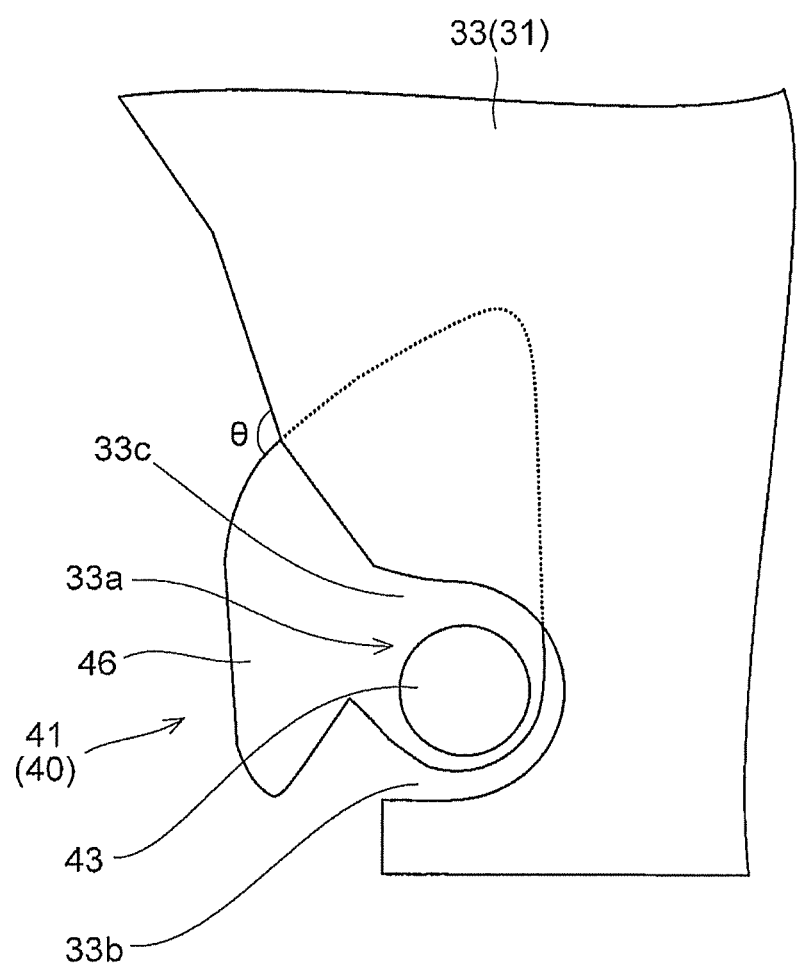
FIG. 8 is an enlarged cross-sectional view illustrating a structure of the first guide rib and the second guide rib of the image forming apparatus according to the one embodiment of the present disclosure.

In FIG. 5 and FIG. 6, the paper sheet P is transported from a lower side to an upper side. In a state before the paper sheet P abuts the lower surface of the detection portion 44 (as illustrated in FIG. 5 and FIG. 6), viewed from the axis direction of the shaft portion 43, the second guide rib 46 closes an opening 33b of the notch portion 33a on the lower side of the shaft portion 43 (on the upstream side in the sheet transport direction). In addition, in a state where the paper sheet P abuts the detection portion 44 so that the actuator portion 41 swings in a clockwise direction in FIG. 6 (as illustrated in FIG. 7 and FIG. 8), viewed from the axis direction of the shaft portion 43, the second guide rib 46 closes an opening 33c of the notch portion 33a on the downstream side in the sheet transport direction (upper side) of the shaft portion 43. In addition, in the state where the paper sheet P abuts the detection portion 44 so that the actuator portion 41 swings (as illustrated in FIG. 7 and FIG. 8), viewed from the axis direction of the shaft portion 43, an angle θ between a part of the first guide rib 33 on the upper side (on the downstream side in the sheet transport direction) and the second guide rib 46 is an obtuse angle. In this way, there is a smooth connection from the second guide rib 46 to the first guide rib 33 so that it is possible to prevent the paper sheet P from being caught by an intersection between the second guide rib 46 and the first guide rib 33.

Further, as illustrated in FIG. 6, also in the state before the paper sheet P abuts the detection portion 44, viewed from the axis direction of the shaft portion 43, the second guide rib 46 may close the opening 33c of the notch portion 33a on the upper side (on the downstream side in the sheet transport direction) of the shaft portion 43. In this case, also before the state where the paper sheet P abuts the detection portion 44, viewed from the axis direction of the shaft portion 43, it is preferred that the angle θ between the upper side part of the first guide rib 33 and the second guide rib 46 be an obtuse angle.

As illustrated in FIG. 5, a sheet abutting portion of the second guide rib 46 is disposed on the lower side (on the upstream side in the sheet transport direction) of the sheet abutting portion (the lowest part) of the detection portion 44 viewed from the axis direction of the shaft portion 43. In this way, the second guide rib 46 abuts the transported paper sheet P earlier than the detection portion 44.

In this image forming apparatus 100, when the paper sheet P is transported in the sheet transport path 18, the front end of the paper sheet P abuts the second guide rib 46 before abutting the detection portion 44. In this case, because the second guide rib 46 closes the opening 33b of the notch portion 33a on the lower side (on the upstream side in the sheet transport direction) of the shaft portion 43, the paper sheet P does not enter the notch portion 33a.

After that, when the front end of the paper sheet P abuts the detection portion 44 of the actuator portion 41, the actuator portion 41 swings in the clockwise direction in FIG. 6. In this case, the second guide rib 46 keeps the paper sheet P away from the notch portion 33a and guides the paper sheet P to the upper side (on the downstream side in the sheet transport direction). Then, when the swing portion 45 swings, the sensor portion 42 detects swinging of the actuator portion 41 so that presence of the paper sheet P is detected by the detection mechanism 40. Further, in the state where the paper sheet P causes the actuator portion 41 to swing (as illustrated in FIG. 7 and FIG. 8), viewed from the axis direction of the shaft portion 43, the second guide rib 46 closes the opening 33c of the notch portion 33a on the upper side of the shaft portion 43. Therefore, the paper sheet P does not enter the notch portion 33a.

After that, when the rear end of the paper sheet P passes the detection portion 44 of the actuator portion 41, a weight of the detection portion 44 and the like causes a downward moment to act on a rotation shaft so that the actuator portion 41 swings in the opposite direction (in the counterclockwise direction in FIG. 8) to return to the original state (a standby state illustrated in FIG. 5 and FIG. 6). In this case, the swing portion 45 also swings in the opposite direction (in the counterclockwise direction in FIG. 8) so that the sensor portion 42 detects swinging of the actuator portion 41 in the opposite direction, and hence absence of the paper sheet P is detected by the detection mechanism 40. Therefore, when the paper sheet P remains in the sheet transport path (transport path) 18 on the downstream side of the fixing roller pair 14, it is determined by the sensor portion 42 that the paper sheet P exists for a predetermined time or longer, and hence jamming of the paper sheet P is detected.

In this embodiment, the notch portion 33a through which the shaft portion 43 of the actuator portion 41 penetrates is formed in the first guide rib 33 as described above. In this way, the shaft portion 43 of the actuator portion 41 can be disposed in the transport guide member 30. In other words, the actuator portion 41 can be easily disposed in the position to abut the paper sheet P and not to prevent transportation of the paper sheet P.

In addition, on the shaft portion 43 of the actuator portion 41, there is disposed the second guide rib 46 closing the opening of the notch portion 33a of the first guide rib 33 viewed from the axis direction of the shaft portion 43. In this way, when the paper sheet P is transported along the transport guide member 30, the paper sheet P can be prevented from entering the notch portion 33a (between the inner circumference surface of the notch portion 33a and the outer circumference surface of the shaft portion 43 of the actuator portion 41). Therefore, it is possible to prevent occurrence of jamming of the paper sheet P.

Specifically, as described above, before the state where the paper sheet P abuts the detection portion 44, viewed from the axis direction of the shaft portion 43, the second guide rib 46 closes the opening 33b of the notch portion 33a on the lower side (on the upstream side in the sheet transport direction) of the shaft portion 43. In this way, it is possible to prevent the paper sheet P from entering the opening 33b of the notch portion 33a on the lower side of the shaft portion 43.

In addition, in the state where the paper sheet P abuts the detection portion 44 so that the actuator portion 41 swings, viewed from the axis direction of the shaft portion 43, the second guide rib 46 closes the opening 33c of the notch portion 33a on the upper side of the shaft portion 43. In this way, it is possible to prevent the paper sheet P from entering the opening 33c of the notch portion 33a on the upper side of the shaft portion 43.

In addition, as described above, in the state where the paper sheet P abuts the detection portion 44 so that the actuator portion 41 swings, viewed from the axis direction of the shaft portion 43, the angle θ between the part of the first guide rib 33 on the upper side of the shaft portion 43 and the second guide rib 46 is an obtuse angle. In this way, it is possible to prevent the front end of the paper sheet P from entering the intersection between the part of the first guide rib 33 on the upper side of the shaft portion 43 and the second guide rib 46 to be hardly able to escape. Therefore, it is possible to further prevent occurrence of jamming of the paper sheet P.

In addition, as described above, the second guide rib 46 is formed to swing about the shaft portion 43. In this way, when the second guide rib 46 swings, the paper sheet P can be guided to the upper side (on the downstream side in the sheet transport direction). Therefore, it is possible to further prevent occurrence of jamming of the paper sheet P.

In addition, as described above, the second guide rib 46 abuts the paper sheet P earlier than the detection portion 44 (or simultaneously with the detection portion 44). In this way, it is possible to prevent the actuator portion 41 from swinging before the paper sheet P abuts the second guide rib 46. Therefore, it is possible to prevent the opening 33b of the notch portion 33a on the lower side of the shaft portion 43 from being opened so that the paper sheet P enters the opened part. In this way, it is possible to further prevent occurrence of jamming of the paper sheet P.

In addition, as described above, the second guide rib 46 is disposed at a position of the shaft portion 43 closer to the outside of the paper sheet passing region (in a vicinity of inside of a position where the end in the width direction of a large size paper sheet passes). The end of the paper sheet P is apt to curl when the size thereof increases. Therefore, the curled front edge of the paper sheet P is apt to enter the notch portion 33a in a position close to the outside of the paper sheet passing region. Therefore, it is particularly effective to dispose the second guide rib 46 at the position on the shaft portion 43 close to the outside of the paper sheet passing region.

In addition, as described above, the transport guide member 30 and the detection mechanism 40 are disposed on the downstream side in the sheet transport direction of the fixing device 13. The paper sheet P after passing the fixing device 13 is apt to be curled by heat and pressure in the fixing process, and hence jamming of the paper sheet P is apt to occur in the downstream in the sheet transport direction of the fixing device 13. Therefore, it is particularly effective to dispose the transport guide member 30 and the detection mechanism 40 on the downstream side in the sheet transport direction of the fixing device 13 so as to prevent occurrence of jamming of the paper sheet P after passing the fixing device 13.

Note that the embodiment disclosed here is an example in every respect and should not be interpreted as a limitation. The scope of the present disclosure is defined not by the above description of the embodiment but by the claims, and further includes all modifications within the meaning and scope equivalent to the claim.

For instance, there is described the example in which the present disclosure is applied to the color printer, but the present disclosure is not limited to this example. It is needless to say that the present disclosure can be applied to various image forming apparatuses such as a monochrome printer, a color copier, a monochrome copier, a digital multifunction peripheral, and a facsimile machine, which include a transport guide member for guiding a recording medium, and a detection mechanism for detecting presence or absence of the recording medium.

In addition, in the embodiment described above, there is described the example in which the present disclosure is applied to the transport guide member and the detection mechanism disposed on the downstream side in the sheet transport direction of the fixing device. However, the present disclosure can be applied to the transport guide member and the detection mechanism disposed at a part of the fixing device other than the downstream side in the sheet transport direction.

Figure 9:
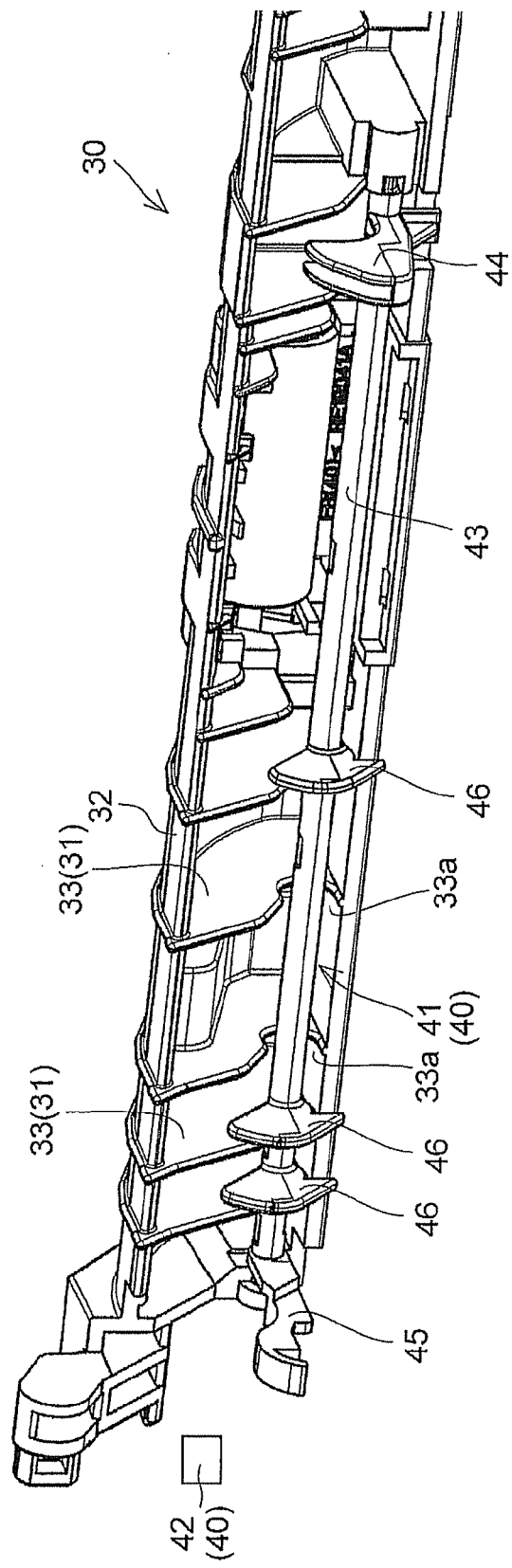
FIG. 9 is a perspective view for explaining a structure of a detection mechanism of a variation of the present disclosure.

In addition, in the embodiment described above, there is described the example in which the second guide rib is disposed only at the position on the shaft portion close to the outside of the paper sheet passing region, but the present disclosure is not limited to this example. For instance, as an variation of the present disclosure illustrated in FIG. 9, it is possible to dispose the second guide rib 46 at both positions on the shaft portion 43 close to the outside and inside of the paper sheet passing region, namely so as to correspond respectively to different width-direction ends of the paper sheets. With this structure, it is possible to prevent occurrence of jamming of not only a large size paper sheet P but also a small size paper sheet P.

In addition, in the embodiment described above, there is described the example in which the second guide rib swings integrally with the shaft portion, but the present disclosure is not limited to this example. The second guide rib may not swing integrally with the shaft portion.

What is claimed is:

1. An image forming apparatus comprising:
   a transport path in which an recording medium passes;
   a transport member disposed in the transport path so as to transport the recording medium;
   a transport guide member constituting the transport path so as to guide the recording medium; and
   a detection mechanism disposed in the transport path so as to detect presence or absence of the recording medium, wherein
   the detection mechanism includes an actuator portion configured to swing when abutting the recording medium, and a sensor portion configured to detect swinging of the actuator portion,
   the actuator portion includes a shaft portion extending in a width direction of the recording medium, which is orthogonal to a transport direction of the recording medium, and a detection portion disposed to protrude outward in the radial direction from the shaft portion so as to swing about the shaft portion in a transport direction when abutting the recording medium,
   the transport guide member includes a base portion, and a plurality of first guide ribs standing on the base portion at a predetermined interval in the width direction of the recording medium so as to guide the recording medium,
   the first guide rib is provided with a notch portion through which the shaft portion of the actuator portion penetrates,
   the shaft portion is provided with a second guide rib disposed at a position corresponding to at least one of the first guide ribs in which the notch portion is formed, so as to protrude outward in the radial direction from the shaft portion, and
   the second guide rib is disposed so as to close an opening of the corresponding notch portion viewed from an axis direction of the shaft portion.

2. The image forming apparatus according to claim 1, wherein in a state before the recording medium abuts the detection portion, viewed from the axis direction of the shaft portion, the second guide rib closes the opening of the notch portion on an upstream side of the shaft portion in the recording medium transport direction.

3. The image forming apparatus according to claim 1, wherein in a state where the recording medium abuts the detection portion so that the actuator portion swing, viewed from the axis direction of the shaft portion, the second guide rib closes the opening of the notch portion on a downstream side of the shaft portion in the recording medium transport direction.

4. The image forming apparatus according to claim 3, wherein in a state where the recording medium abuts the detection portion so that the actuator portion swing, viewed from the axis direction of the shaft portion, an angle at which the first guide rib and the second guide rib cross each other on the downstream side in the recording medium transport direction is an obtuse angle.

5. The image forming apparatus according to claim 1, wherein viewed from the axis direction of the shaft portion, a recording medium abutting portion of the second guide rib is disposed on the upstream side of a recording medium abutting portion of the detection portion in the transport direction.

6. The image forming apparatus according to claim 5, wherein the second guide rib abuts the transported recording medium earlier than the detection portion does.

7. The image forming apparatus according to claim 1, wherein the second guide rib is disposed in a region of the shaft portion where an end in the width direction of the recording medium passes.

8. The image forming apparatus according to claim 7, wherein the second guide rib comprises a plurality of second guide ribs which are disposed so as to correspond respectively to different width-direction ends of the recording medium.

9. The image forming apparatus according to claim 1, further comprising a fixing device for fixing a toner image on the recording medium, wherein
   the transport guide member and the detection mechanism are disposed on the downstream side in the recording medium transport direction of the fixing device.

10. The image forming apparatus according to claim 1, wherein the transport guide member is disposed on the downstream side in the transport direction of an image forming portion, one surface of the first guide rib guides the recording medium on which an image is formed in the image forming portion to a discharge portion, and the other surface formed on a backside of the base portion guides the recording medium transported reversely from the discharge portion to a double-sided transport path.

* * * * *